(12) United States Patent
Bielstein (10) Patent No.: US 9,041,799 B2
(45) Date of Patent: May 26, 2015

(54) FOOD ITEM POSITIONAL DISPLAY SYSTEM AND METHOD

(76) Inventor: Lee A. Bielstein, Bellevue, NE (US)

(*) Notice: Subject to any disclaimer, the term of this patent is extended or adjusted under 35 U.S.C. 154(b) by 1471 days.

(21) Appl. No.: 12/326,543

(22) Filed: Dec. 2, 2008

(65) Prior Publication Data

US 2010/0134620 A1 Jun. 3, 2010

(51) Int. Cl.
*H04N 7/18* (2006.01)

(52) U.S. Cl.
CPC .................................... *H04N 7/188* (2013.01)

(58) Field of Classification Search
CPC ............ H04N 7/188; A21B 1/42; A21B 1/46; A21B 7/00; B65G 2203/04; B65G 2203/041; B65G 2203/042; B65G 2203/0233; A47J 37/00
USPC .......................................................... 348/143
See application file for complete search history.

(56) References Cited

U.S. PATENT DOCUMENTS

| 4,860,096 | A * | 8/1989 | Long et al. ...................... 348/61 |
| 5,428,392 | A * | 6/1995 | Castro et al. .................. 348/295 |
| 6,396,031 | B1 * | 5/2002 | Forrester ....................... 219/494 |
| 2002/0180960 | A1 * | 12/2002 | Koren et al. ............... 356/237.2 |
| 2005/0021407 | A1 * | 1/2005 | Kargman ........................ 705/15 |
| 2005/0049922 | A1 * | 3/2005 | Kargman ........................ 705/15 |
| 2006/0081135 | A1 * | 4/2006 | Britton et al. .................. 99/486 |
| 2008/0052174 | A1 * | 2/2008 | Miyazaki et al. ............... 705/15 |
| 2008/0124434 | A1 * | 5/2008 | Hrudka .......................... 426/233 |
| 2008/0178749 | A1 * | 7/2008 | Stutman ......................... 99/494 |
| 2008/0308356 | A1 * | 12/2008 | Spiro et al. ...................... 186/57 |
| 2011/0002677 | A1 * | 1/2011 | Cochran et al. ............... 392/416 |
| 2011/0050872 | A1 * | 3/2011 | Harbert et al. .................. 348/61 |

OTHER PUBLICATIONS

U.S. Appl. No. 61/022,990, filed Jan. 23, 2008.*

* cited by examiner

*Primary Examiner* — June Sison
(74) *Attorney, Agent, or Firm* — Stinson Leonard Street LLP (57) ABSTRACT

A system and method for displaying the actual position of one or more food items on a conveyorized oven system on a display monitor. Digital images of each food item are captured, stored and processed into positional imaging data using data transmitted from sensors adjacent to the conveyorized oven system. Characteristic data for each food item may be associated with the positional imaging data. The characteristic and positional imaging data of the food items may be stored or communicated to a display monitor for the user to view.

25 Claims, 7 Drawing Sheets

FOOD ITEM POSITIONAL DISPLAY SYSTEM AND METHOD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to food preparation systems and more particularly to a system and method that displays the position of a food item, such as a pizza, as it travels through an enclosed conveyorized oven.

2. Description of Related Art

There are many types of ovens known in the art for cooking food items such as deck ovens, conveyor ovens and carousel ovens. A typical deck oven comprises a discrete cooking chamber having a back, sides, a top, a bottom and an opening for an access door. The food item is placed into the cooking chamber through the access door and remains in the chamber for the desired cooking time. To check the cooking status of the food item a user must open the access door and peer into the cooking chamber. Once the food item is cooked to the desired level, as determined by repeatedly opening the access door as described above, the food item it is removed from the cooking chamber via the access door.

As an alternative to wasting time and heat energy by opening and closing the access door to the cooking chamber, conveyorized ovens are well known in the art to transport food items through the cooking chamber. One known conveyorized oven employs a continuous conveyor belt for moving food items through the cooking chamber where the cooking chamber comprises a top, a bottom, opposing essentially closed sides and opposing slotted ends. The cooking chamber is typically provided with heating elements located above and below the conveyor belt, where the conveyor belt is typically driven by a drive roller at one end of the belt with the belt passing through the slotted ends of the cooking chamber to transport the food items into and out of the cooking chamber. In addition to controlling the temperature of the cooking chamber, the speed of the drive roller may be adjusted to vary the cooking time of food items by varying the time for the items to advance through the cooking chamber. While using this type of conveyorized oven, it is difficult to ascertain the position of the food item in the cooking chamber because typically the only openings in the oven to peer into are the slots in the opposing ends of the cooking chamber or through a small access door typically in the oven section.

Accordingly, there exists a need in the art for ascertaining the position of a food item as it advances through an conveyorized oven, without having to open an access door and peer into the oven.

BRIEF SUMMARY OF THE INVENTION

The present invention relates to a system and method for displaying the position of a food item, such as a pizza, as it travels through an enclosed conveyorized oven.

The food item positional display system of the present invention comprises a conveyorized oven. The conveyorized oven comprises a conveyor including a loading section, an exiting section and an oven section there between. The system comprises at least one image capture device to capture imaging data of a food item and at least one display monitor to display positional imaging data corresponding to the food item. The positional imaging data comprises positional data. The system comprises a computer in communication with the at least one image capture device and the at least one display monitor, wherein the computer receives imaging data from at least one image capture device, processes the positional data into the imaging data to provide positional imaging data, and transmits the positional imaging data to at least one display monitor.

In another embodiment, the image capture and display system comprises a conveyorized oven. The conveyorized oven having a loading section, an oven section and an exiting section and at least one image capture device to capture imaging data of at least one food item. The system comprises at least one data input device to input characteristic data. A display monitor exhibits the imaging data and the characteristic data corresponding to at least one food item wherein the imaging data comprises positional imaging data. The system comprises a computer in communication with at least one image capture device, at least one data input device, and at least one display monitor, wherein the computer receives the imaging data from at least one image capture device and processes the positional data into the imaging data to provide positional imaging data, and wherein the computer receives the characteristic data from at least one data input device and processes the characteristic data into the positional imaging data. The computer transmits the positional imaging data to at least one display monitor.

In another embodiment, a method of displaying food item position comprises capturing imaging data from at least one video capture device, processing positional data into the imaging data to produce positional imaging data, and transmitting the positional imaging data to at least one display monitor.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIGS. 4, 6 and 7 depict a flow chart of a method in accordance with a second exemplary embodiment of the present invention.

DETAILED DESCRIPTION OF PREFERRED EMBODIMENT

The present invention is directed to a system and method for providing a user the position of a pizza on an advancing conveyor through an enclosed oven by displaying an image of the pizza on a monitor that correlates to the actual position of the pizza.

The term "real-time" as used herein is meant to be a broad term and is used in its ordinary sense and includes the processing of data that presents or outputs a result so rapidly the interaction appears to be instantaneous. For example, a device that processes data in real-time may process the data as it is received by the device. Real-time imaging data is data that is capable of being displayed within a very short time after being captured by a particular device.

The term "merge" as used herein is meant to be a broad term and is used in its ordinary sense and includes, for example, superimposing, combining, and deleting and replacing data.

While several exemplary embodiments of the present invention arc discussed below, those skilled in the art will readily appreciate that various modifications may be made to these embodiments, and the invention is not limited to the configurations described therein.

First Exemplary Embodiment

Figure 1:
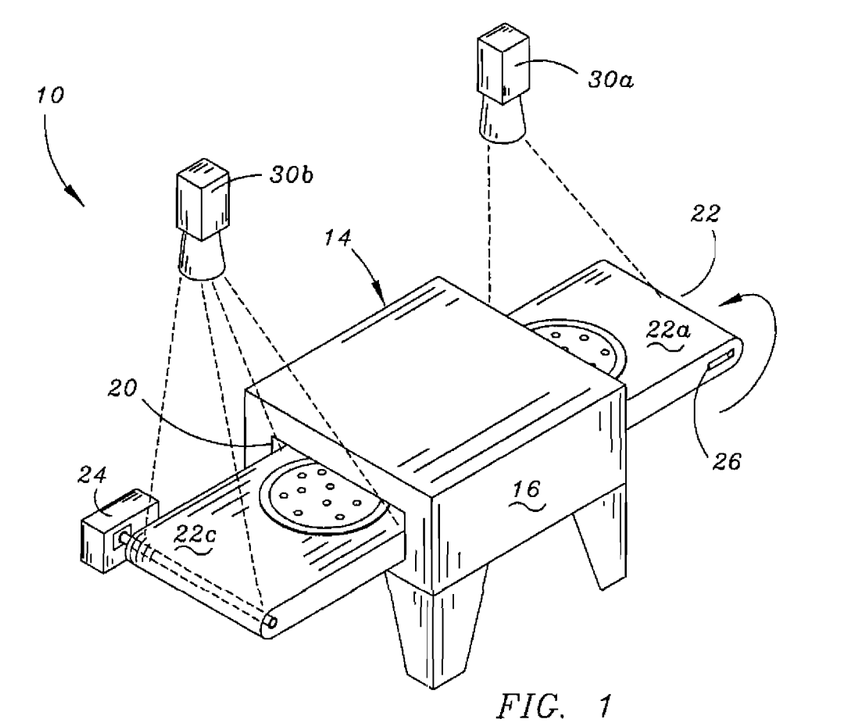
FIG. 1 is a perspective view of a food position display system in accordance with an exemplary embodiment of the present invention.
Figure 2:
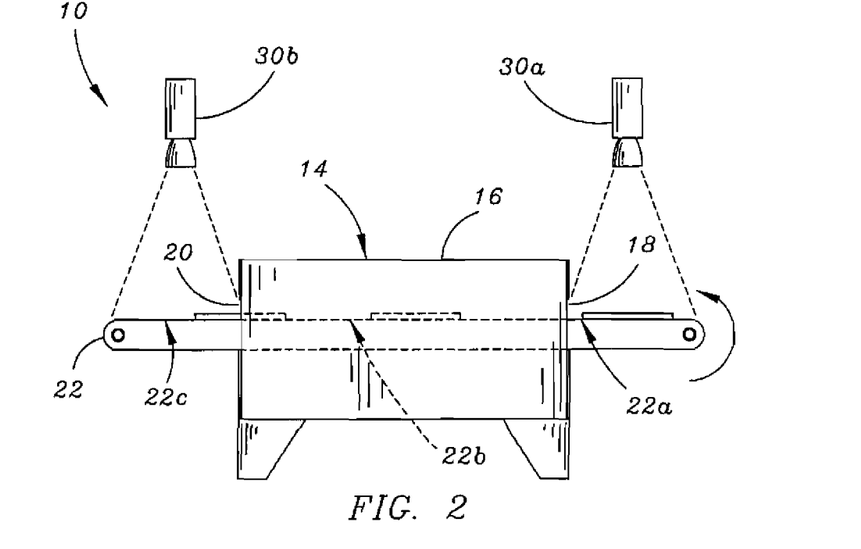
FIG. 2 is a side cross-sectional view of the system of FIG. 1.
Figure 3A:
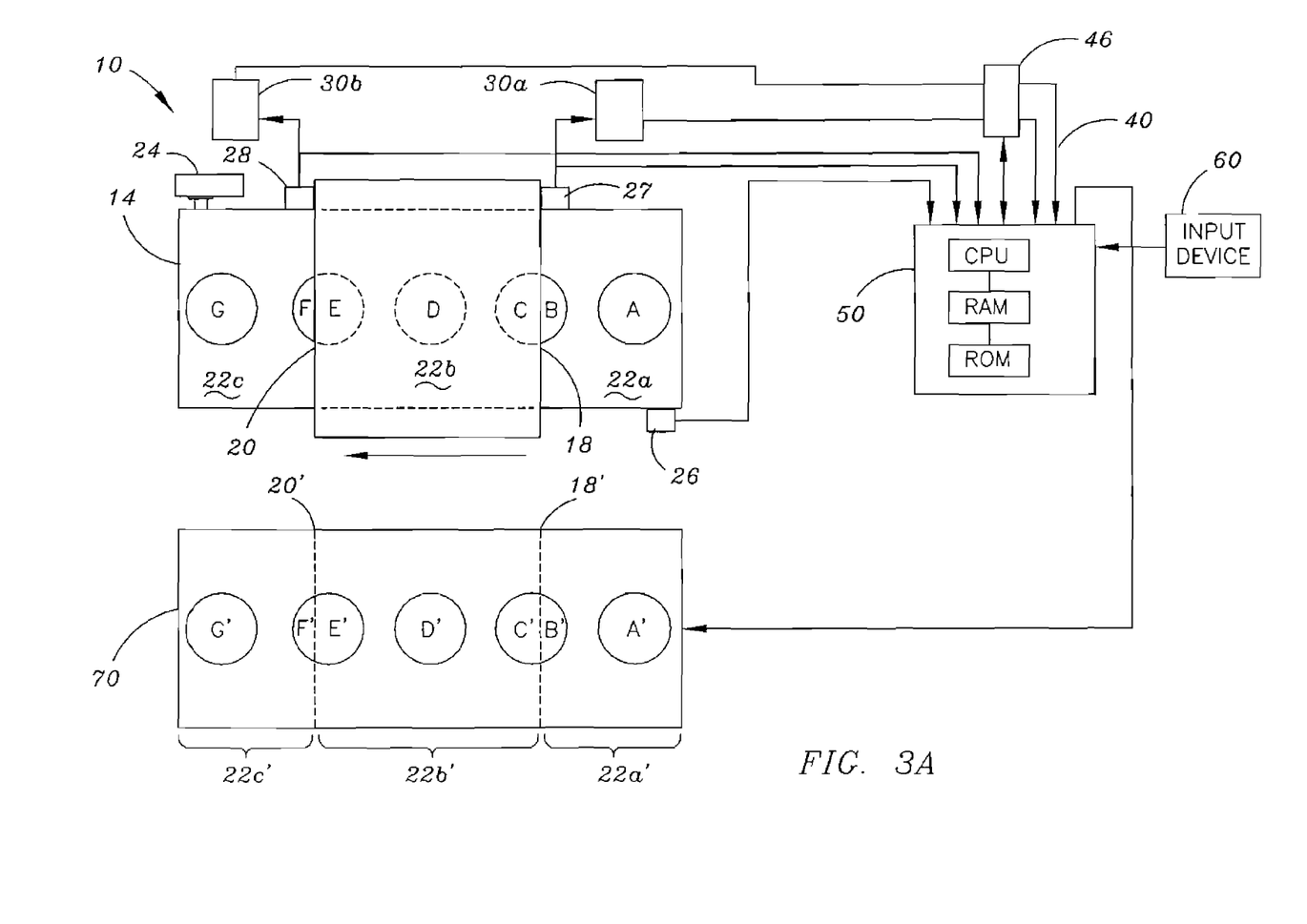
FIG. 3A is a block diagram of the system of FIG. 1.

Referring to FIGS. 1-2 and FIG. 3A, a food item positional display system in accordance with a first exemplary embodiment of the present invention is designated generally by the reference numeral 10. System 10 comprises a conveyorized pizza oven 14, a computer 50 and a display monitor 70. Image capture devices 30a and 30b are provided for capturing image data. A switch 46 may be included to turn on and off one or both of the image capture devices 30a and 30b.

With reference to FIGS. 1 and 2, as is known in the art, conveyorized pizza oven 14 includes an oven 16, defined by a bottom wall, a top wall, right and left side walls, respectively, a front wall, and a rear wall. In the left side wall is a left aperture 20 and in the right side wall is a right aperture 18. The left aperture 20 and right aperture 18 align to allow conveyor 22 to pass there through. The oven 16 is heated by at least one heating means (not shown) in the cooking section, typically a gas burner or an electrical radiant heater. The conveyor 22 herein may be any conventional conveyor for advancing a pizza through the oven section and thus no additional specific description is required. The conveyor 22 has loading section 22a where typically an uncooked pizza is placed. Adjacent loading section 22a, conveyor 22 has an oven section 22b that is completely enclosed by the oven 16. Downstream from the oven section 22b is exiting section 22c where a cooked pizza is typically located before it is further processed (i.e., boxed). Conveyor 22 may move in a continuous loop via any conventional drive means such as an electric motor 24 and various gears and belts (not shown). Examples of such conveyorized ovens include model XLT3270-TS manufactured by BOFI Inc. Of course, other types of conveyorized pizza ovens and multiple conveyorized pizza ovens may also be used. For example, multiple stacked ovens with conveyors positioned above or below one another or multiple ovens with conveyors positioned adjacent to each other are within the scope of this invention. It is appreciated that the direction of advance of the conveyor may also alternatively move right to left as viewed in FIG. 1, and accordingly the loading and exiting sections would be on opposite sides of the oven section 22b.

The speed of the conveyor 22 and thus, the speed of advance of a pizza through the oven, may be controlled by any appropriate means, such as a speed controller (not shown) for the electric motor 24. A device to provide the rate of advance or speed of the conveyor 22, such as a speed sensor 26, is placed in communication with the conveyor to provide conveyor speed data to the computer 50. The speed sensor 26 may be of any type known in the art, including sensing speed by detection of marks on the conveyor through a variety of physical measures. A triggering device, such as triggering sensor 27 is positioned adjacent right aperture 18 and a triggering sensor 28 is positioned adjacent left aperture 20. The triggering sensors 27, 28 may be of any type adapted to detect the presence of an object crossing a predetermined boundary, for example a motion sensor or beam sensor (i.e., commonly referred to as an electric eye). Triggering sensors 27, 28 communicate with image capture devices 30a and 30b, respectively, and with computer 50 via communication link 40. It is understood that other devices in other configurations may be used to detect the speed of the conveyor and trigger the image capture devices.

The communication link 40, shown in FIG. 3A, may comprise any type of communication network that is capable of transmitting data. For example, but not by way of limitation, the communication link 40 may transmit data via dedicated wire connections, the internet or by an Ethernet data link. Communication link 40 for the purposes of the present invention, includes one or more of all input and output communications, to and from the computer 50, as appropriate.

As shown in FIGS. 1 and 2, image capture devices 30a and 30b are positioned generally in spaced relationship above conveyor loading section 22a and exiting section 22c, respectively. The image capture devices 30a and 30b may be digital video cameras, although other image capture devices could also be used, such as webcams, cctv cameras and digital still cameras that are adapted to provide data representative of a image. As shown in FIG. 1, the image capture devices 30a, 30b may be positioned or mounted in any conventional manner provided the capture field of view includes the top view of the conveyor loading section 22a and exiting section 22c. The image capture devices 30a, 30b are capable of producing imaging data representative of an image of a pizza placed within the respective fields of view. The imaging data captured by image capture devices 30a, 30b, is forwarded to computer 50 via communication link 40.

FIG. 3A shows that system 10 also includes a computer 50 that can take the form of any appropriate computer. Examples of well-known computers that are suitable for use with the present invention include personal computers and server computers, however other computing systems could also be used. Computer 50 comprises a CPU operable to execute computer-readable instructions stored on a computer-readable medium to thereby perform various processes of the present invention, as will be described in greater detail herein below. The computer-readable instructions executed by CPU may be coded in software using Microsoft®.NET or VB.NET, although other programming languages could also be used, such as BASIC®, C®, C++®, C#®, COBOL®, Fortran®, Java®, Lisp® or Pascal®. The computer 50 may include any type of internal or external memory, such as floppy disks, conventional hard disks, CD-ROMS, flash ROMS, nonvolatile ROM and RAM for storing data. The computer may also be provided with input devices 60 such as a keyboard, touchscreen or pointing device as are well known in the art for allowing a user to control the system and to input data.

The computer 50, as shown in FIG. 3A, is in communication with display monitor 70 via communication link 40. Display monitor 70 is preferably a flat screen monitor such as a liquid crystal display or plasma monitor or may optionally be a CRT monitor or any other screen capable of display. Display monitor 70 is provided in the system to display real-time and stored imaging data captured by the image capture devices 30a and 30b. Display monitor 70 is adapted to display reference boundary lines or demarcations 18' and 20' corresponding to the entry boundary of oven 16 formed by aperture 18 and exit boundary of oven 16 formed by aperture 20 of the oven 16, respectively. The display monitor 70 is configured in sections to represent the sections of the conveyor 22. For example, display monitor 70 includes a section 22a' representing the loading section 22a of the conveyor 22, a section 22b' representing the oven section 22b of the conveyor 22, and a section 22c' representing the exiting section 22c of the conveyor 22.

It is also understood that additional computers and display monitors may be provided in the system, but for a simplified system the two image capture devices 30a, 30b and the single display monitor 70 may all be connected to a single computer 50.

Figure 4:
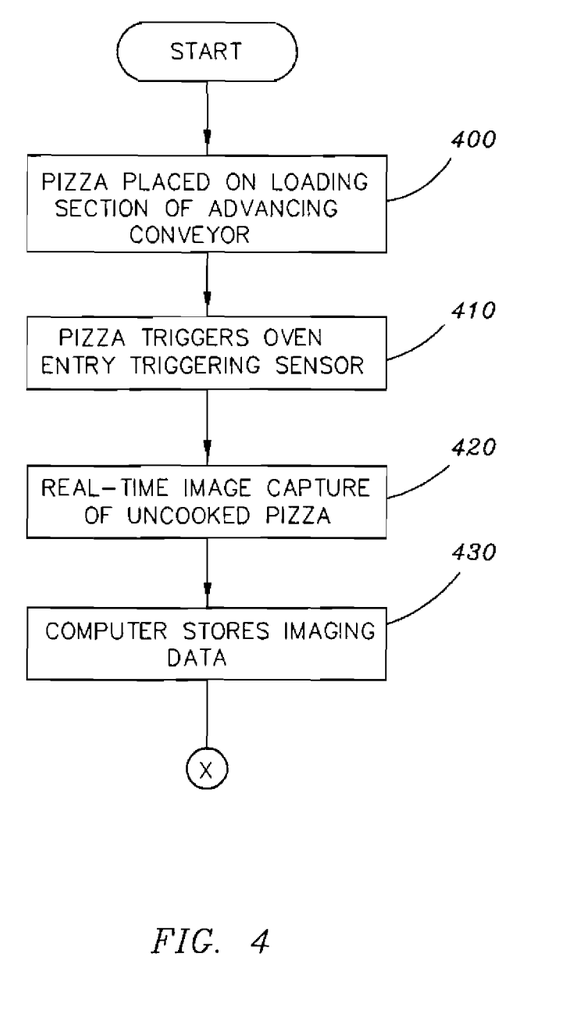
FIGS. 4-6 depict a flow chart of a method in accordance with a first exemplary embodiment of the present invention.
Figure 5:
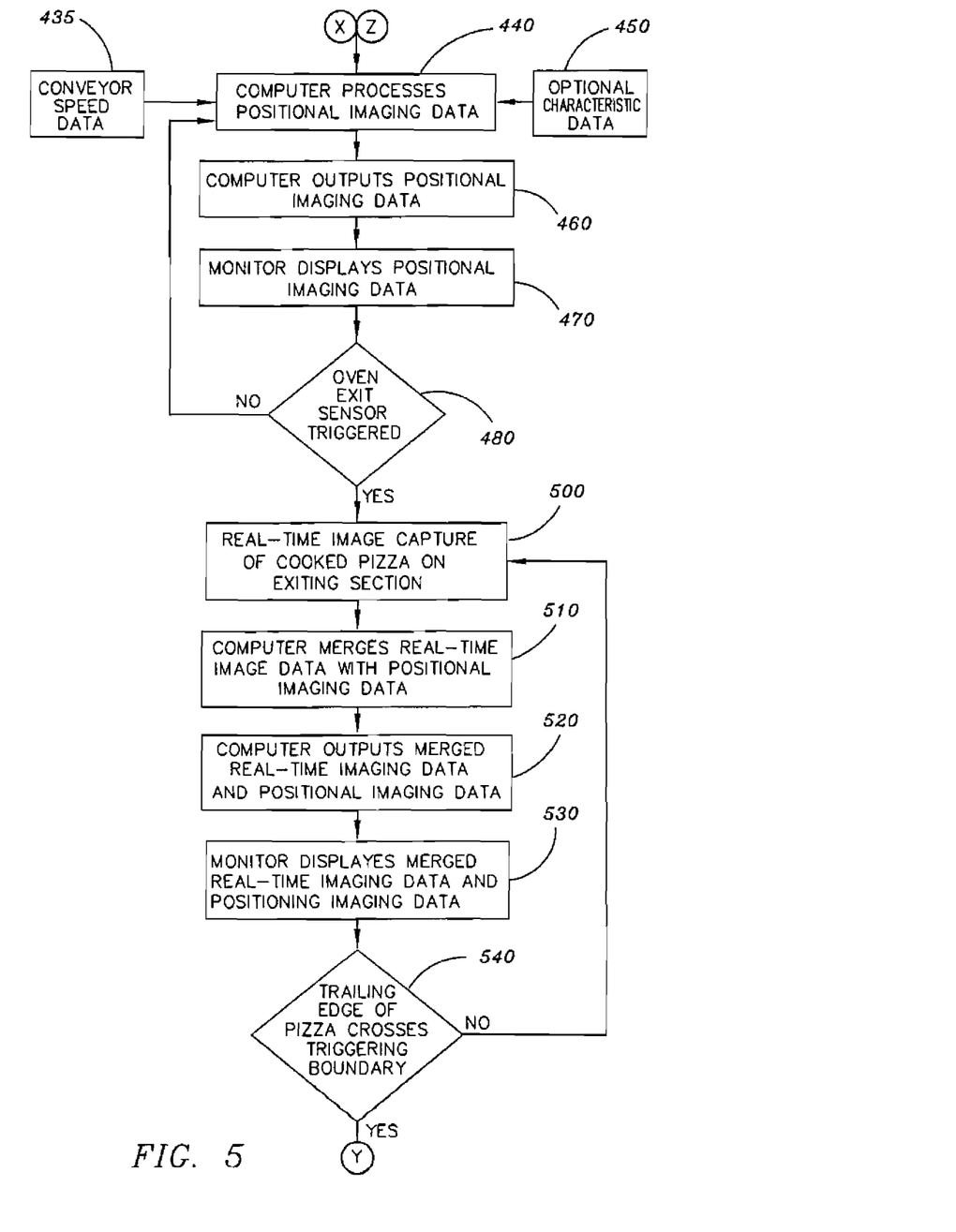

With the structure of the system set forth, the operation of the system will now be described. FIGS. 4-5 are flow diagrams of a method in accordance with the first exemplary embodiment of the system 10. Referring to FIG. 3-5, when a pizza is placed on the loading section 22a of the conveyor 22, (step 400) represented by A in FIG. 3A, triggering sensor 27 is activated as the leading edge of the pizza crosses the triggering sensor's boundary (step 410). The triggering sensor 27 via communication link 40 activates video capture device 30a to capture the real-time image of the uncooked pizza (step 420). The real-time image of the uncooked pizza in position A is transmitted to the computer 50 via communication link 40 for storage and further processing (steps 430, 440). The real-time video image that is stored in memory of computer 50 will, hereafter be referred to as the stored imaging data.

As shown in FIG. 3A, the stored imaging data corresponding to the actual pizza A on loading section 22a is transmitted to (step 460) and displayed on display monitor 70 as A' in a position corresponding to the actual placement of the pizza in position A on the loading section 22a of the conveyor (step 470). At this initial step, there is no positional data, as described below, to apply to the stored imaging data before it is transmitted to the display monitor 70 for display.

To update the position of the pizza on display monitor 70 as the pizza advances on conveyor 22, computer 50 is adapted to processes the elapsed time from the triggering sensor data, (i.e., from when the leading edge of the pizza crosses triggering sensor 27 boundary) in combination with the conveyor speed data from speed sensor 26. As shown in FIG. 4, the conveyor speed data (step 435) is continually transmitted from speed sensor 26 via communication link 40 to computer 50. The computer 50 processes the elapsed time and the conveyor speed data into positional data. The computer 50 then updates the stored imaging data with the positional data to provide positional imaging data. The positional imaging data correlates to the actual position of the pizza on conveyor 22. The positional imaging data is sent to the display monitor 70 for display via the communication link 40 (step 470).

Thus, as the pizza moves via the conveyor 22 into the oven 16, passing the oven entry boundary 18, as shown in FIG. 3A, only part of the actual pizza as represented by position B will be visible to the user. The portion of the pizza that is in oven 16 is represented by position C. The computer continues to update the stored imaging data with positional data, in the manner described above, such that the updated positional imaging data sent to display monitor 70 corresponds to the actual position of the pizza on the conveyor as represented on the display monitor 70. The display monitor 70 in FIG. 3A, displays the pizza comprised of stored imaging data with positional data applied as represented by B'/C'. The user may use the demarcation 18' on monitor 70 as a reference point to correlate the position of the pizza on the actual conveyor 22 passing into the oven section 14 through aperture 18.

When the pizza is positioned fully inside oven 16, as represented by D in FIG. 3A, no part of the pizza is visible to the user. As shown in FIG. 4, the computer 50 processes the speed and elapsed time data and applies the resultant positional data to the stored imaging data to produce updated positional imaging data (step 440). The updated positional imaging data is transmitted to display monitor 70 via communication link 40 (step 460). The positional imaging data represented by D' on the display monitor 70 correlates the actual position of the pizza in position D in oven section 22b (step 470).

As the pizza exits the oven 16, passing the left aperture 20, as shown in FIG. 3A, the user is able to view only the portion of the actual pizza represented by F. The remainder of the pizza, as represented by position E, is not visible to the user. Triggering sensor 28 is activated as the leading edge of the pizza crosses the boundary of triggering sensor 28 (step 480). Referring to FIG. 5, triggering sensor 28 activates image capture device 30b to capture the real-time image of the cooked pizza (step 500). The real-time image of the cooked pizza in position F is transmitted to computer 50 via communication link 40. Computer 50 updates the positional imaging data corresponding to the position of the pizza represented by E and merges the real-time image of the cooked pizza in position F with the updated positional imaging data of the uncooked pizza in position E (step 510). Referring to FIG. 5, Computer 50 then transmits the merged image F'/E' to display monitor 70 (step 520). As the pizza advances on the conveyor 22, the real-time image of the pizza will account for an increasingly greater percentage of the merged image transmitted to display monitor 70, until a 100% real-time image is transmitted to the display monitor 70 not comprising any positional imaging data (step 530).

The computer 50 performs the merge function using known techniques in the art. For example, the computer 50 may remove a portion of the image corresponding to the stored imaging data and fill the removed portion with the corresponding portion of the real-time image, forming a merged image on display monitor 70 that appears to be a partially cooked pizza (real-time image) and a partially uncooked pizza (positional image data). In another example, the real-time image may be layered on top of the stored image such that the stored image underneath the real-time image is not seen when computer 50 transmits the merged image to display monitor 70.

A triggering signal is sent to computer 50 via communication link 40 as the trailing edge of the cooked pizza passes the boundary of the triggering sensor 28. When the trailing edge of the cooked pizza crosses triggering boundary of triggering sensor 28 (step 540), the pizza is fully on the exiting section of the conveyor 22c and the video capture device 30b captures a real-time image of the cooked pizza in position G (step 600). The real-time image is transmitted to computer 50 via communication link 40 and the computer 50 outputs the real-time image to display monitor 70 via communication link 40 (step 610). The display monitor 70 displays the real time image of cooked pizza (step 620). As shown in FIG. 3A, the captured real-time image of cooked pizza in position G is displayed on the display monitor 70 as G' corresponding to the actual position of the cooked pizza on the exiting section 22c of the conveyor. Additionally, as the trailing edge of the pizza passes the boundary of triggering sensor 28, the triggering signal prompts computer 50 to store in memory an image of the cooked pizza in position G. The stored image of the cooked pizza may be accessed by computer 50 at any time for reference, such as for training or quality control analysis.

Figure 3B:
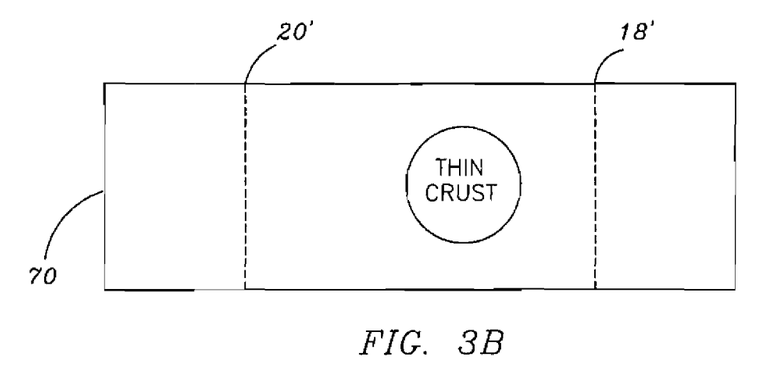
FIGS. 3B and C show optional monitor display of characteristic data.
Figure 3C:
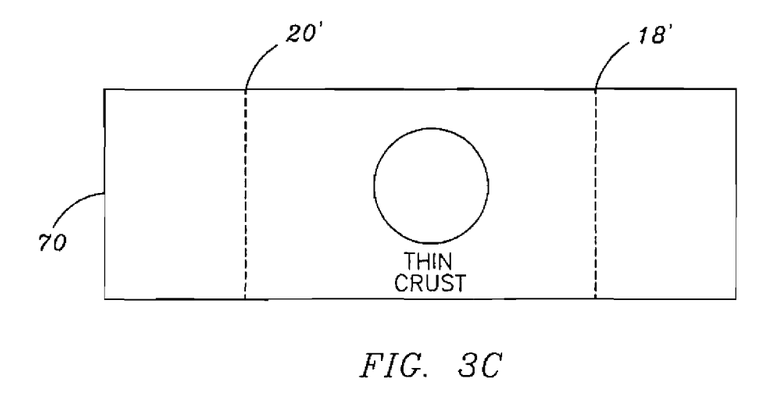

As shown in FIGS. 3B and 3C, the display monitor 70 may also be used to display characteristic data. Characteristic data may be any relevant or special information a user identifies and may be associated with a specific pizza being processed by the system 10 (step 450). For example, but not as a limitation, the characteristic data may include additional graphics or images or text, such as: pizza ingredients, pizza crust type, pizza topping selections, time pizza placed on conveyor, time pizza in oven (i.e. elapsed time), cooking time remaining for pizza, order number, pizza cutting instructions, pizza delivery instructions, processing instructions, customer preferences, system command prompts or system menu selections.

Characteristic data may be input to computer 50 by a user via input devices 60, such as a touchscreen or keyboard. Characteristic data may be adapted to be received from other programs or data resident on computer 50 or from external systems or devices via input/output ports (not shown) of computer 50. Computer 50 may also receive or interface with external systems and devices through a wireless protocol utilizing short-range communications technology facilitating data transmission, such as Bluetooth®. For example, but not by way of a limitation, computer 50 may comprise a port such as a serial port, a universal serial port (USB), a firewire port or a dongle that can be used to download data from other computers or handheld devices.

In one embodiment, for example, the computer 50 receives the characteristic data from the input device 60 and processes the characteristic data into the positional imaging data (step 440). The computer 50 then transmits the positional imaging data (with the characteristic data) to the display monitor 70 (step 460). Referring to FIGS. 3B and 3C, the computer 50 may position the characteristic data in various locations on display monitor 70. For example, as shown in FIG. 3B, computer 50 may be adapted to display the characteristic data adjacent to the pizza on the display monitor 70 to associate the information with the respective pizza. Alternatively, computer 50 may be adapted to position the characteristic data superimposed on top of the image as shown in FIG. 3C, or in a tabular format in a selected portion of the display monitor 70. Of course, the characteristic data may be updated at any time and selectively seen or not seen based on the user commands through input devices 60 to computer 50. The characteristic data may also be adapted to be viewed or accessed remotely, for example by customers or absent store owners or managers (not shown). Accordingly, access to the characteristic data may also be denied based on the user commands through input devices 60 to computer 50. In this example, the computer 50 may be adapted to limit the access a customer has to characteristic data to only the specific pizza being processed for them through system 10. Additionally, characteristic data may be limited to process related data of a specific pizza and not characteristic data that may comprise private customer information.

Note, the invention is not limited to displaying the pre-cooked pizza imaging data in C', D' and E', but may provide any imaging data or representation of the pizza processed by computer 50 to realistically represent the pizza as it progresses from position 22a to position 22c through the oven 16. For example, based on the elapsed time from the triggering of triggering sensor 27 and the speed data continuously provided to computer 50 by speed sensor 26, computer 50 may present stored imaging data to display monitor 70 processed to represent the pizza progressively browning as it moves on conveyor 22 from position 22a to position 22c through the oven 16.

Second Embodiment

Figure 3D:
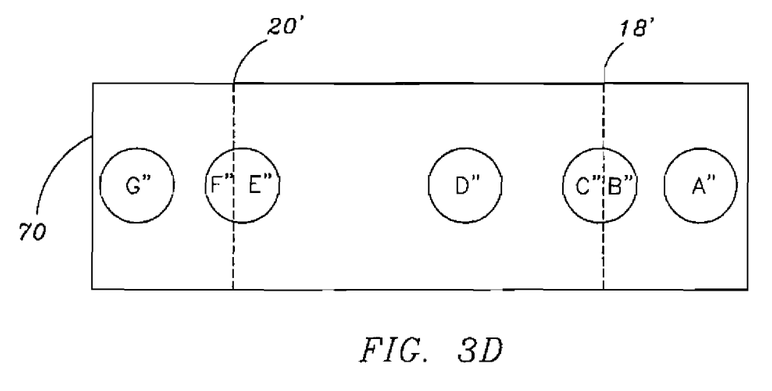
FIG. 3D shows a display monitor of the second embodiment.
Figure 6:
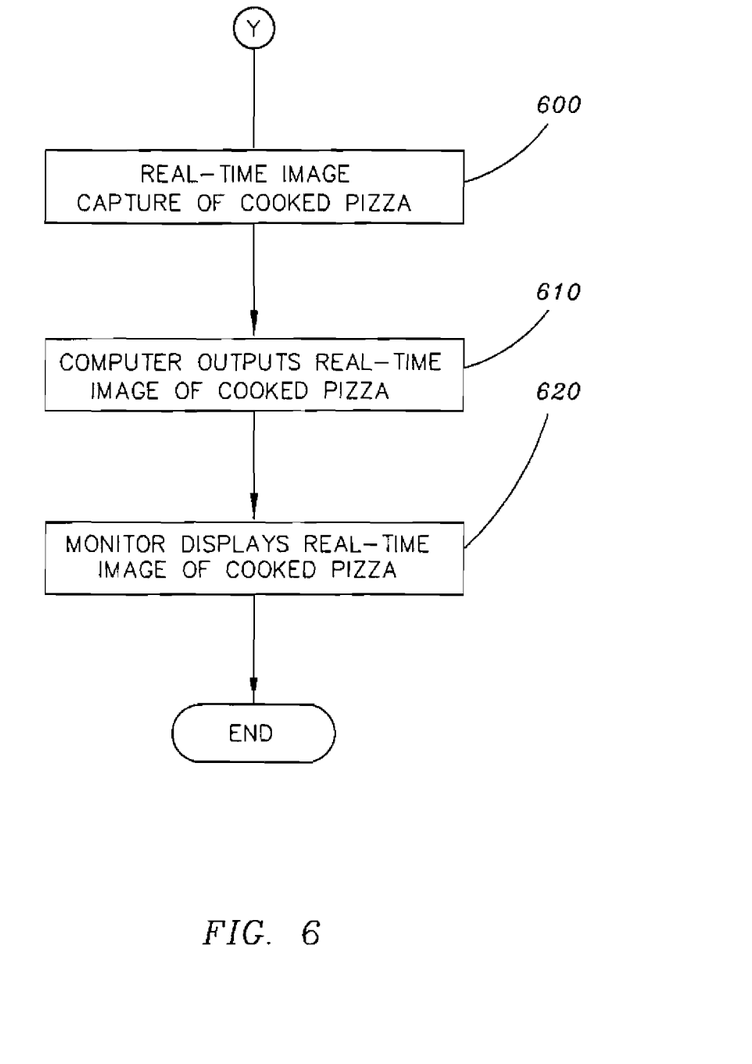
Figure 7:
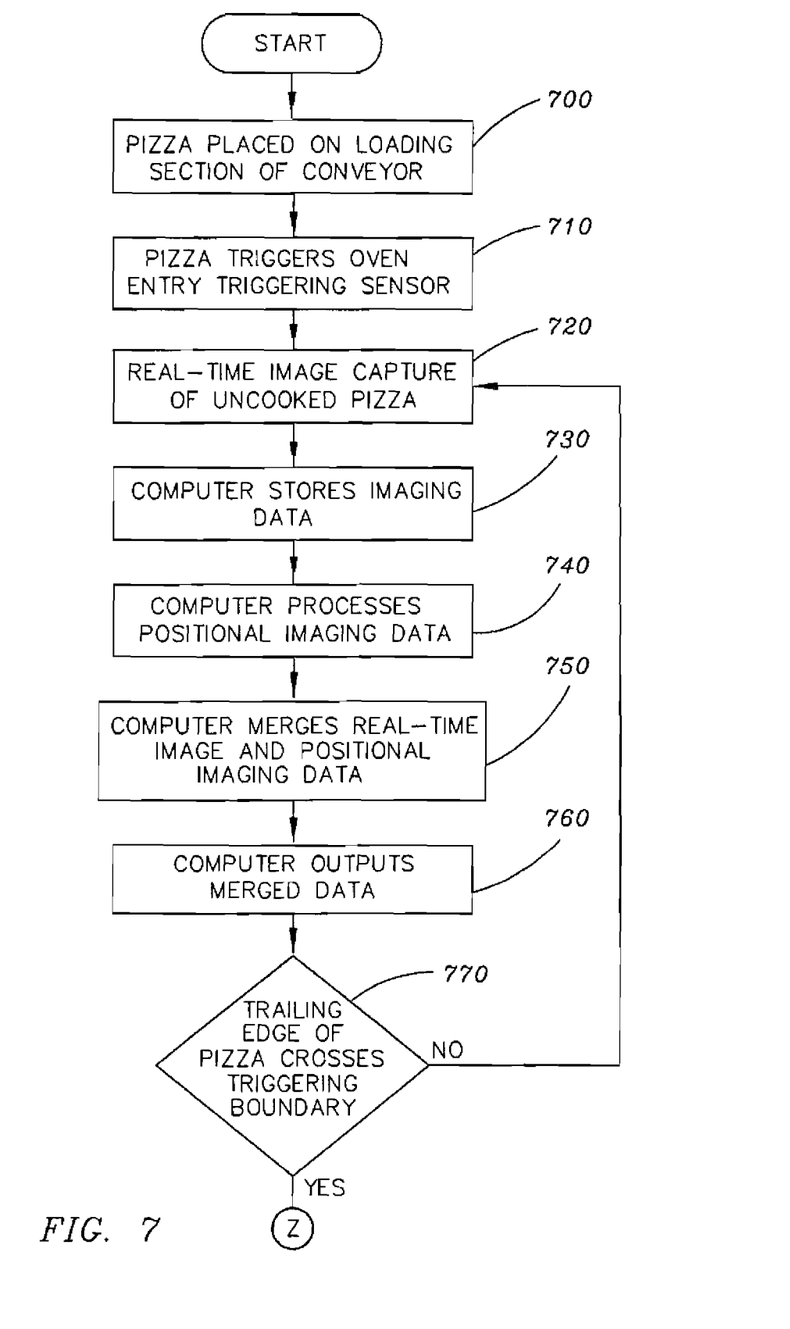

Referring to FIGS. 3A, 3D, and sequentially FIG. 7 and FIGS. 5-6, a food positional display system in accordance with a second exemplary embodiment of the present invention is designated by the reference numeral 10. The system 10 comprises a conveyorized pizza oven 14, a computer 50 and a display monitor 70. Image capture devices 30a and 30b are provided for capturing image data.

As will be apparent, system 10 in the second exemplary embodiment is identical to system 10 in the first exemplary embodiment. The conveyorized pizza oven 14 includes an oven 16, defined by a bottom wall, a top wall, right and left side walls, respectively, a front wall, and a rear wall. In the left side wall is a left aperture 20 and in the right side wall is a right aperture 18. The left aperture 20 and right aperture 18 align to allow conveyor 22 to pass there through. The speed of the conveyor 22 and thus the speed of advance of a pizza through the oven, may be controlled by any appropriate means, such as a speed controller. A triggering device, such as triggering sensor 27 is positioned adjacent right aperture 18 and a triggering sensor 28 is positioned adjacent left aperture 20. Image capture devices 30a and 30b are positioned generally in spaced relationship above conveyor loading section 22a and exiting section 22c, respectively. The system also includes a computer 50 that can take the form of any appropriate computer. The computer 50 is in communication with display monitor 70 via communication link 40.

With the structure of the system set forth as in FIG. 3A, the operation of the system will now be described. FIGS. 4, 6 and 7 depict a flow diagram of a second exemplary embodiment of the system 10. In particular, the flow diagram begins with FIG. 7, then continues in FIGS. 5 and 6. In effect, FIG. 7 replaces FIG. 4 of the first exemplary embodiment.

Referring to FIGS. 3A and 3D and FIG. 7, when a pizza is placed on the loading section 22a of the conveyor 22 (step 700), represented by A, triggering sensor 27 is activated as the leading edge of the pizza crosses the triggering sensor's boundary (step 710). The triggering sensor 27 via communication link 40 activates video capture device 30a to capture the real-time image of the uncooked pizza (step 720). The real-time image of the uncooked pizza in position A is transmitted to the computer 50 via communication link 40 for storage and further processing (steps 730 and 740). The real-time video image that is stored in memory of computer 50 will, hereafter be referred to in this embodiment as the stored imaging data.

In this embodiment, the real-time image, not the stored imaging data corresponding to the actual pizza A on loading section 22a, is transmitted to and displayed on display monitor 70 as A" (FIG. 3D) in a position corresponding to the actual placement of the pizza in position A on the loading section 22a of the conveyor.

To update the position of the pizza on display monitor 70 as the pizza advances on conveyor 22, computer 50 processes the elapsed time from the triggering sensor data, (i.e., from when the leading edge of the pizza crosses triggering sensor 27 boundary) in combination with the conveyor speed data which is continually transmitted via communication link 40 to computer 50. The computer 50 processes the elapsed time and the conveyor speed data into positional data. The computer 50 then updates the stored imaging data with the positional data to provide positional imaging data (step 750). The positional imaging data correlates to the actual position of the pizza on conveyor 22. The positional imaging data is sent to the display monitor 70 via the communication link 40.

Thus, as the pizza moves via the conveyor 22 into the oven 16, passing the oven entry boundary 20, as shown in FIG. 3A, only part of the actual pizza as represented by position B will be visible to the user. The non-visible portion of the pizza that is in oven 16 is represented by position C. The computer 50 continues to update the stored imaging data with positional data, in the manner described above, such that the updated positional imaging data sent to display monitor 70 corresponds to the actual position of the pizza on the conveyor as represented on the display monitor 70. The display monitor 70 in FIG. 3D, displays the pizza comprised of the real-time image of the uncooked pizza being captured B" merged with the stored imaging data with positional data applied C" as represented by B"/C" (step 760).

The computer 50 performs the merge function as described in the first embodiment. For example, the computer 50 may remove a portion of the displayed image corresponding to the stored image and filling the removed portion with the corresponding portion of the real-time image, forming a merged image on display monitor 70. In another example, the real-time image may be layered on top of the stored image such that the stored image underneath the real-time image is not seen.

Again, as the conveyor 22 advances, speed sensor 26 continues to detect the speed of the conveyor and transmits the speed data to computer 50. The computer 50 processes positional data in accordance with the elapsed time from the initial triggering signal of the triggering sensor 27 and the speed signal provided from the speed sensor 26. Computer 50 applies the positional data to the stored imaging data and outputs updated positional image data corresponding to the position of the pizza on the conveyor 22.

Once the trailing edge of the pizza crosses the entry triggering boundary (step 770) the pizza is positioned fully inside oven 16, as represented by D, and no part of the pizza is visible to the user. As shown in FIG. 3A, the computer 50 processes the speed, elapsed time data and applies the resultant positional data to the stored imaging data to produce updated positional imaging data. The updated positional imaging data is transmitted to display monitor 70 via communication link 40. As shown in FIG. 3D, the imaging data represented by D" on the display monitor 70 correlates the actual position of the pizza in position D on conveyor section 22b.

As the pizza exits the oven 16, passing the left aperture 20, as shown in FIG. 3A, the user is able to view only the portion of the actual cooked pizza represented by F. The remainder of the pizza, as represented by position E, is not visible to the user. Triggering sensor 28 is activated as the leading edge of the pizza crosses the triggering sensor's 28 boundary. The triggering sensor 28 activates image capture device 30b to capture the real-time image of the cooked pizza. The real-time image of the cooked pizza in position F is transmitted to computer 50 via communication link 40. Computer 50 updates the positional imaging data corresponding to the position of the pizza represented by E. Computer 50 merges the real-time image of the cooked pizza in position F with the updated positional imaging data of the uncooked pizza in position E. Computer 50 then transmits the merged image F"/E" to display monitor 70. As the pizza advances on the conveyor 22, the real-time image of the pizza F" will account for a greater percentage of the merged image transmitted to display monitor 70 until a 100% real-time image is transmitted to the display monitor 70 not comprising any positional imaging data E". Again, the computer 50 performs the merge function as described above.

As shown in FIG. 3A, when the pizza is fully on the exiting section of the conveyor 22c, the video capture device 30b captures a real-time image of the cooked pizza in position G. The real-time image is transmitted to computer 50 via communication link 40. The computer 50 outputs the real-time image to display monitor 70 via communication link 40. As shown in FIGS. 3A and 3D, the captured real-time image of cooked pizza in position G is displayed on the display monitor 70 as G" corresponding to the actual position of the pizza on the exiting conveyor section 22c. A triggering signal is sent to computer 50 via communication link 40 as the trailing edge of the pizza passes the boundary of triggering sensor 28 (step 770). The triggering signal prompts computer 50 to store an image of the cooked pizza in position G. The stored image of the cooked pizza may be accessed at any time for reference, such as for training or quality control analysis.

In this embodiment as in the first exemplary embodiment, the display monitor 70 may also be used to display characteristic data. Characteristic data may be input to computer 50 by a user via input devices 60. Characteristic data may be adapted from internal databases of computer 50 or input from external sources via input ports of computer 50. Characteristic data may be of any relevant information a user identifies and may be positioned in various locations on display monitor 70.

This embodiment is not limited to displaying the precooked pizza imaging data in C", D" and E", but may provide any imaging data or representation of the pizza processed by computer 50 to realistically represent the pizza as it progresses from position 22a to position 22c through the oven 16. For example, based on the elapsed time from the triggering of the triggering sensor 27 and the speed data continuously provided to computer 50 by speed sensor 26, computer 50 may present stored imaging data to display monitor 70 processed to represent the pizza progressively browning as it moves on conveyor 22 from position 22a to position 22c through the oven 16.

As in the first exemplary embodiment, computer 50 may be adapted to receive or interface with other programs or data resident on computer 50 or with external systems or devices through input/output ports or wireless technology.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A food item positional display system, comprising:
   a conveyorized oven, said conveyorized oven comprising a conveyor, said conveyor including a loading section, an exiting section and an oven section there between, said loading section and exiting section located outside said oven and said oven section located within said oven,
   at least one image capture device to capture imaging data of at least one food item,
   at least one display monitor to display positional imaging data corresponding to an actual position of said at least one food item on said oven section of said conveyor within said oven, said positional imagining data comprising positional data, and a computer in communication with said at least one image capture device and said at least one display monitor, wherein said computer receives said imaging data from said at least one image capture device, processes said positional data into said imaging data to provide positional imaging data, and transmits said positional imaging data to said at least one display monitor.

2. The food item positional display system of claim 1, wherein said at least one image capture device is adapted to capture imaging data of said at least one food item on said loading section.

3. The food item positional display system of claim 1, wherein said at least one image capture device is adapted to capture imaging data of said at least one food item on said exiting section.

4. The food item positional display system of claim 1, wherein said at least one image capture device comprises a web cam, a video camera, or a digital camera.

5. The food item positional display system of claim 1, wherein said positional imaging data comprises at least a portion of real-time imaging data.

6. The food item positional display system of claim 1, wherein said positional imaging data comprises at least a portion of stored imaging data.

7. An image capture and display system, comprising:
a conveyorized oven, said conveyorized oven having a loading section, an oven section and an exiting section,
at least one image capture device to capture imaging data of at least one food item,
at least one data input device to input characteristic data,
at least one display monitor to exhibit said imaging data and said characteristic data corresponding to an actual position of said at least one food item on said oven section of said conveyor within said oven, wherein said imaging data comprises positional imaging data, and
a computer in communication with said at least one image capture device, said at least one data input device, and said at least one display monitor,
wherein said computer receives said imaging data from said at least one image capture device and processes said positional data into said imaging data to provide positional imaging data, and
wherein said computer receives said characteristic data from said at least one input device and processes said characteristic data into said positional imaging data, and transmits said positional imaging data to said at least one display monitor.

8. The image capture and display system of claim 7, wherein said at least one image capture device is adapted to capture imaging data of said at least one food item on said loading section.

9. The image capture and display system of claim 7, wherein said at least one image capture device is adapted to capture imaging data of said at least one food item on said exiting section.

10. The image capture and display system of claim 7, wherein said at least one image capture device comprises a web cam, a video camera, or a digital camera.

11. The food item positional display system of claim 7, wherein said positional imaging data comprises at least a portion of real-time imaging data.

12. The food item positional display system of claim 7, wherein said positional imaging data comprises at least a portion of stored imaging data.

13. The image capture and display system of claim 7, wherein said at least one video display displays said characteristic data in tabular form.

14. The image capture and display system of claim 7, wherein said at least one video display displays said characteristic data adjacent said positional imaging data.

15. The image capture and display system of claim 7, wherein said at least one display monitor displays said characteristic data superimposed over said positional imaging data.

16. The image capture and display system of claim 7, wherein said characteristic data further includes processing instructions data.

17. A method of displaying food item position at least one food item within an oven, comprising:
providing a conveyorized oven, said conveyorized oven comprising a conveyor, said conveyor including a loading section, an exiting section and an oven section there between, said loading section and exiting section located outside said oven and said oven section located within said oven,
capturing imaging data from at least one video capture device,
processing positional data into said imaging data to produce positional imaging data, wherein said positional imaging data corresponds to an actual position of said at least one food item on said oven section of said conveyor within said conveyorized oven,
transmitting said positional imaging data to at least one display monitor.

18. The food item positional display system of claim 17, wherein said positional imaging data comprises at least a portion of real-time imaging data.

19. The food item positional display system of claim 17, wherein said positional imaging data comprises at least a portion of stored imaging data.

20. The method of claim 17, further comprising inputting characteristic data and processing said characteristic data into said positional imaging data.

21. The method of claim 17, wherein said at least one display monitor displays said positional imaging data wherein said positional imaging data comprises characteristic data.

22. The method of claim 17, wherein said at least one display monitor displays said characteristic data in tabular form.

23. The method of claim 17, wherein said at least one display monitor displays said characteristic data adjacent said positional imaging data.

24. The method of claim 17, wherein said at least one display monitor displays said characteristic data over said positional imaging data.

25. The method of claim 17, wherein said characteristic data further comprises processing instructions.

* * * * *